(12) United States Patent
Hickey et al.

(10) Patent No.: US 11,487,637 B2
(45) Date of Patent: Nov. 1, 2022

(54) GLOBAL INLINE NAME SPACE VERIFICATION FOR DISTRIBUTED FILE SYSTEMS

(71) Applicant: EMC IP Holding Company LLC, Hopkinton, MA (US)

(72) Inventors: Charles I Hickey, Aptos, CA (US); Murthy V Mamidi, San Jose, CA (US); Neerajkumar N Chourasia, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 562 days.

(21) Appl. No.: 16/517,441

(22) Filed: Jul. 19, 2019

(65) Prior Publication Data

US 2021/0019243 A1 Jan. 21, 2021

(51) Int. Cl.
  *G06F 11/30* (2006.01)
  *G06F 11/22* (2006.01)
  *G06F 11/10* (2006.01)
  *G06F 3/06* (2006.01)

(52) U.S. Cl.
  CPC .......... *G06F 11/2289* (2013.01); *G06F 3/065* (2013.01); *G06F 3/067* (2013.01); *G06F 3/0619* (2013.01); *G06F 3/0641* (2013.01); *G06F 11/1004* (2013.01); *G06F 11/3082* (2013.01); *G06F 11/3086* (2013.01)

(58) Field of Classification Search
  CPC ............. G06F 11/3086; G06F 11/3082; G06F 3/0619; G06F 3/0641; G06F 3/0643; G06F 3/067
  See application file for complete search history.

(56) References Cited

U.S. PATENT DOCUMENTS

| | | | | |
|---|---|---|---|---|
| 8,190,835 | B1* | 5/2012 | Yueh | G06F 12/00 711/170 |
| 9,130,972 | B2* | 9/2015 | Barkan | G06F 21/606 |
| 9,361,302 | B1* | 6/2016 | Mao | G06F 16/116 |
| 9,898,369 | B1* | 2/2018 | Moghe | G06F 16/128 |
| 2011/0033128 | A1* | 2/2011 | Watkins | G06F 16/184 382/254 |
| 2012/0204024 | A1* | 8/2012 | Augenstein | G06F 11/1453 713/150 |
| 2014/0006362 | A1* | 1/2014 | Noronha | G06F 3/0689 707/692 |
| 2014/0052706 | A1* | 2/2014 | Misra | G06F 16/1837 707/698 |
| 2014/0181039 | A1* | 6/2014 | Harrison | G06F 16/164 707/652 |

(Continued)

*Primary Examiner* — Joseph O Schell

(74) *Attorney, Agent, or Firm* — Staniford Tomita LLP

(57) ABSTRACT

Embodiments for providing global inline name space verification for a distributed file system in a network of a metadata server coupled to a plurality of data servers by taking a global dataless snapshot of a namespace of the distributed file system; walking all of the files in the namespace for each data server and the metadata server to generate parsed information; combining, by an XOR operation, the parsed information into data blocks for each server; obtaining a checksum of each data block of the data blocks; comparing actual and expected checksums from the metadata server and all of the data servers; and generating an alert if a comparison of any actual and expected checksums do not match.

18 Claims, 7 Drawing Sheets

(56) References Cited

U.S. PATENT DOCUMENTS

| | | | |
|---|---|---|---|
| 2014/0250066 A1* | 9/2014 | Calkowski | H04L 67/06 707/624 |
| 2015/0227757 A1* | 8/2015 | Bestler | H04L 9/3239 713/167 |
| 2016/0048533 A1* | 2/2016 | Goldstein | G06F 9/00 707/827 |
| 2017/0255666 A1* | 9/2017 | Rueger | G06F 11/10 |
| 2018/0234247 A1* | 8/2018 | Bouterse | G06F 21/64 |
| 2018/0239677 A1* | 8/2018 | Chen | G06F 11/203 |
| 2018/0330082 A1* | 11/2018 | Aksenfeld | H04L 9/3247 |

* cited by examiner

GLOBAL INLINE NAME SPACE VERIFICATION FOR DISTRIBUTED FILE SYSTEMS

TECHNICAL FIELD

Embodiments are generally directed to distributed file systems, and specifically to global inline name space verification.

BACKGROUND

A distributed file system (DFS) or network file system is a file system that allows access to files from multiple hosts through a computer network, thus allowing multiple users on multiple machines to share files and storage resources.

Distributed file systems have the advantage of being able to increase their capacity and capability through the incremental addition of compute and storage resources on a local area network. This is distinct from traditional file systems, such as the Linux EXT3 or Windows NTFS, that run on a single computer (or "node"), and can quickly exhaust that system's compute and storage resources. Practically all file systems provide some form of verification program (e.g., FSCK on Linux or chkntfs on Windows) to check the consistency of the file system (with possible repairs), but these run only when the file system is offline. Other file systems such as Data Domain's DDFS go one step further and provide a continuous or "inline" verification process that runs while the file system is in use. Such an inline verification process is able to detect problems before they result in a serious loss or corruption of user data. Either way, single node file systems have a distinct advantage when it comes to verification because all the data they need to examine is in one place.

Verifying the integrity of a distributed file system while it is in operation is thus a non-trivial problem. One aspect of this problem is that the file system under load is in a state of continuous change, potentially receiving hundreds of megabytes of incoming data to each node on the network concurrently. Performing a verification process across a cluster of systems consumes significant amounts of network bandwidth by having to ship data back and forth between the nodes.

What is needed, therefore, is a method and system of efficiently providing verification in a distributed file system with respect to network bandwidth and resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell, EMC, and Data Domain are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
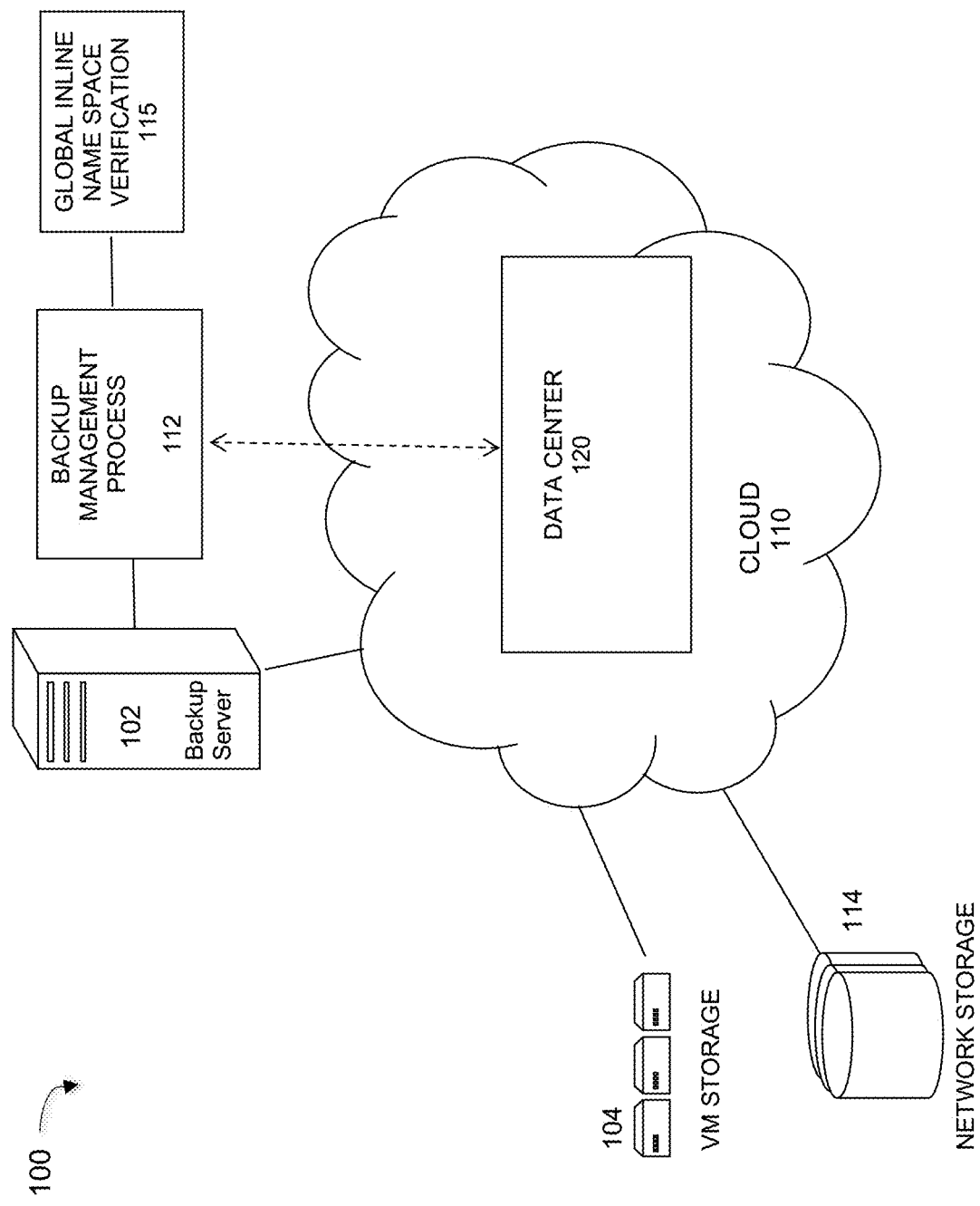
FIG. 1 illustrates a computer network that implements a global inline verification process for distributed file systems, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Disclosed herein are methods and systems directed to global inline verification process for distributed file systems using a new type of capture mechanism known as a Global Dataless Snapshot, a lightweight checksum method, and a form of relaxed ordering to achieve both optimal performance and integrity. In a system including a metadata server and multiple data servers, the method includes taking a global dataless snapshot of a namespace of the distributed file system and then walking all of the files in the namespace for each data server and the metadata server to generate parsed information. The parsed information is combined by an XOR operation into data blocks for each server, and a checksum of each data block is obtained. Actual and expected checksums from the metadata server and all of the data servers are compared and alert can be generated any actual and expected checksums do not match.

Embodiments of the distributed file system may be used in any sort of cluster or multi-server network environment, such as in large data center applications that contain many computer resources (nodes) that are organized in different ways, such as by function or purpose, and that may be part of networks or subnetworks that regularly grow or shrink depending on the changing needs of an organization. In marked contrast to single-node computer systems, cluster systems represent a scale-out solution to single node systems by providing a set of networked computers that work together so that they essentially form a single system. Each computer forms a node in the system and runs its own instance of an operating system. The cluster itself has each node set to perform the same task that is controlled and scheduled by software. Capacity is naturally increased based on the number of computers and is thus easily scalable by adding or deleting nodes, as needed. However with such dynamic scaling, some means of verifying file system consistency during runtime and in an efficient manner is required.

FIG. 1 illustrates a computer network that implements a global inline verification process for distributed file systems, under some embodiments. System 100 comprises a large-scale network that includes a number of different devices, such as server or client computers 102, data center 120, storage devices 114, and other similar devices or computing resources. Other networks may be included in system 100 including local area network (LAN) or cloud networks 110 and virtual machine (VM) storage 104 or VM clusters. These devices and network resources may be connected to a central network, such as a central or cloud computing network 110 that itself contains a number of different computing resources (e.g., computers, interface devices, and so on). FIG. 1 is intended to be an example of a representative system implementing a clustered backup appliance access process under some embodiments, and many other topographies and combinations of network elements are also possible.

For the example network environment 100 of FIG. 1, server 102 is a backup server that executes a backup management process 112 that coordinates or manages the backup of data from one or more data sources, such as other servers/clients to storage devices, such as network storage 114 and/or virtual storage devices 104, or other data centers. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114. Backup targets or appliances may also be included in a data center 120 hosted in its own network (e.g., cloud) 110. Data center 120 may represent the computing resources running the information technology (IT) system of an organization or enterprise, and which are organized an interconnected in their own network, such as cloud 110. Typical data centers are relatively large-scale data centers that may be distributed around the world, but embodiments are not so limited. Any appropriate scale of intra- and inter-networked computers may be used, such as data centers within a state or region, municipality, or organization (e.g., corporation, school, University, hospital, etc.).

The network or networks of system 100 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform. In an embodiment, parts of system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process 112. Thus, backup process 112 causes or facilitates the backup of this data to the storage devices of the network, such as network storage 114, which may at least be partially implemented through storage device arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system within a data center comprising a server or servers and other clients, and the data may reside on one or more hard drives (e.g., 114) for the database(s) in a variety of formats. The backup server 102 may be a server running Networker or Avamar data protection software backing up to Data Domain protection storage, such as provided by Dell/EMC™ Corporation. However, other similar backup and storage systems are also possible.

As stated above, for the embodiment of system 100, network server 102 is a backup server that executes a deduplication backup process. The deduplication backup process may also be run partially or wholly within a VM, instead or as well. Network server 102 may also be a server computer that supports part or all of the hypervisor functions. In an embodiment, the virtual machines that use or are used as part of the deduplication backup process are implemented as part of a Data Domain (DD) system, though embodiments are not so limited. Data Domain systems present a single, filesystem across all storage to enable ease-of-use and simple management. This single filesystem can be completely or partially exposed as CIFS shares (for Windows), NFS mount points (for Unix/Linux), VTL for open systems and IBMi and/or through advanced integration with Data Domain Boost (for Dell EMC Avamar, Dell EMC Networker, Dell EMC Greenplum, Veritas NetBackup, Veritas Backup Exec, Oracle RMAN and Quest vRanger, and other similar programs).

In a deduplication backup system utilizing virtual machines (VMs), each VM runs its own file system, such as a Data Domain Restorer (DDR) or Data Domain File System (DDFS) by EMC Corp., along with other possible applications. In the DDFS (or similar) file system, protocol-specific namespaces are presented to clients/applications for accessing the logical file system layer. Some example protocol namespaces include: Data Domain Virtual Tape Library, Data Domain Boost storage units, and CIFS/NFS fileshares.

Purpose built back-up servers using the Data Domain Deduplicating Filesystem (DDFS) rely on the Data Integrity Architecture (DIA) which provides customers with robust protection of their data. Extending DDFS into a true distributed file system as part of a Virtual Scale Out (VSO) effort requires extending DIA across a cluster of computers. Embodiments of a global inline name space verification process 115 perform regular online verification of the distributed file system name space when it is spread across a number of computers with minimal additional resource usage, as compared to current offline methods.

In an embodiment, process 115 uses a new type of capture mechanism known as a Global Dataless Snapshot, which is a lightweight checksum method, and a form of relaxed ordering to achieve both optimal performance and integrity. It provides periodic online namespace integrity checking in a distributed file system that involves little cross network traffic. Such a system provides significant advantages over present methods that generate much more cross traffic or take an inordinately long execution time by comparison.

Mtree Implementation for Deduplication Backup Systems

For a system such as system 100 of FIG. 1, files and directories for each namespace are usually stored in Mtrees, which are user-defined logical partitions of the DDFS that enable more granular management of the file system. Mtree replication enables the creation of copies of Mtrees at secondary locations. In DDFS, the files and directories within Mtrees as well as Mtree snapshots, all reference the same pool of unique segments called a collection, which is made up of log-structured containers that organize the segments on disk to optimize throughput and deduplication effectiveness. Although embodiments are described with respect to distributed file systems using Mtrees, embodiments are not so limited, and other similar data structures or self-balancing tree structures, such as B−Trees, B+Trees, and so on, may be used.

In a DDFS system, an Mtree is a modified version of a B+Tree, which is used to store the namespace of the file system in persistent storage. In general, a B+Tree is a self-balancing tree data structure that maintains sorted data and allows searches, sequential access, insertions, and deletions in logarithmic time. An inode (index node) is a filesystem data structure that describes an object, such as a file or directory. Each inode stores the attributes and disk block locations of the object's data. File-system object attributes may include metadata that encodes information such as time of last change, access, modification, owner, permission data, and so on. Directories are lists of names assigned to inodes. A directory contains an entry for itself, its parent, and each of its children.

Figure 2:
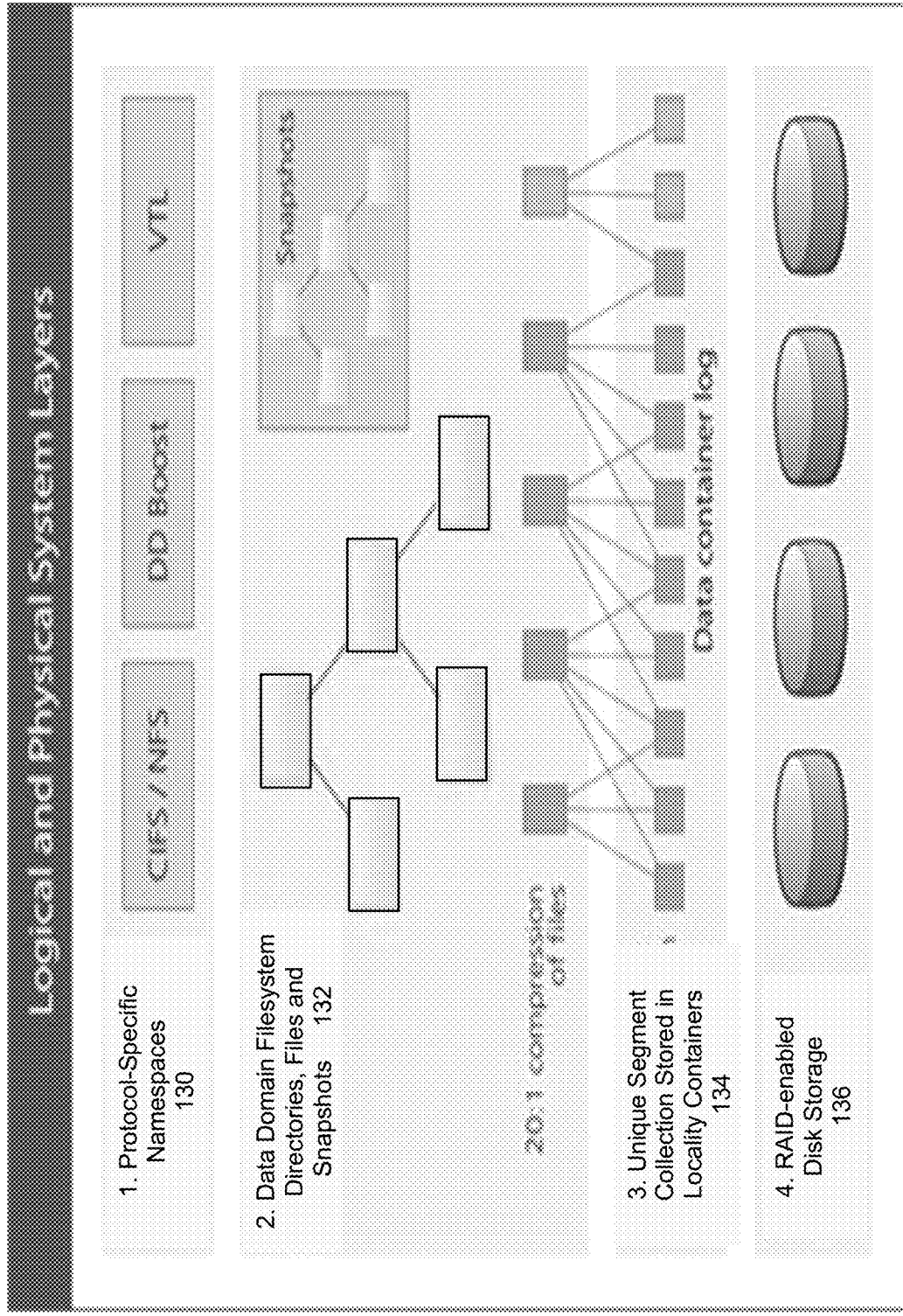
FIG. 2 illustrates levels of data abstraction in a Data Domain system including Mtrees that implement a global inline verification process for distributed file systems, under some embodiments.

FIG. 2 illustrates levels of data abstraction in a Data Domain system including Mtrees that implement a clustered backup appliance access method, under some embodiments. As shown in FIG. 2, the Data Domain File System (DDFS) comprises protocol-specific namespaces 130 that provide an external interface to applications, such as CIFS/NFS file shares (over Ethernet), virtual tape libraries (VTL) (over Fibre Channel) and DD Boost storage units (SUs). A Data Domain deployment may use any combination of these simultaneously to store and access data. The filesystem Mtrees, directories, files and snapshots layer 132 contain the files and directories for each namespace that are stored in an Mtree in DDFS. Mtree snapshots are logical and very space-efficient because they share the same underlying data segments. A unique segment collection 134 is stored in locality containers: A 'collection' is the set of files (or virtual tapes) and logical Mtree snapshots. The system identifies and eliminates duplicate segments within each container and then writes compressed deduplicated segments to physical disk. Segments are unique within the collection (not including specific duplicates maintained in DDFS to enable self-healing or fast recovery). Each Data Domain system has a single collection that is stored in a log of segment locality containers. The RAID-enabled disk storage layer 136 comprises a collection containers layer over RAID enabled disk drive blocks to ensure data security and integrity.

An Mtree replication process may be used to replicate Mtrees between Data Domain systems and can be used replicating data written via CIFS, NFS, or VTL. Unlike collection replication, Mtree replication offers flexible replication topologies like one-to-one, bidirectional, one-to-many, many-to-one and cascaded. It also offers the flexibility to selectively replicate only a portion of the data written to the source system. Files replicated from the source will land on the destination active tier first regardless if the data is on the active tier or retention tier. This provides the flexibility to the user to set different data movement policies between the source and destination. Managed file replication is used when integrating with applications via Dell EMC Data Domain Boost (e.g. Dell EMC NetWorker, Dell EMC Avamar, Veritas NetBackup, Oracle RMAN, etc.). With managed file replication, backup applications can selectively replicate specific backup images and keep track of all the copies in the application's catalog for easy recovery. Further, the backup application can configure separate retention periods for each copy of the backup image.

Virtualization Architecture

As shown in FIG. 1, one or more aspects of system 100 may be embodied using virtualization technology that allows computer resources to be expanded and shared through the deployment of multiple instances of operating systems and applications that run virtual machines. A virtual machine network is managed by a hypervisor or virtual machine monitor (VMM) program that creates and runs the virtual machines. The server on which a hypervisor runs one or more virtual machines is the host machine, and each virtual machine is a guest machine. The hypervisor presents the guest operating systems with a virtual operating platform and manages the execution of the guest operating systems. Multiple instances of a variety of operating systems may share the virtualized hardware resources. For example, different OS instances (e.g., Linux and Windows) can all run on a single physical computer. In an embodiment, system 100 illustrates a virtualized network in which a hypervisor program supports a number (n) VMs 104. A network server supporting the VMs (e.g., network server 102) represents a host machine and target VMs (e.g., 104) represent the guest machines. Target VMs may also be organized into one or more virtual data centers or as part of data center 120 representing a physical or virtual network of many virtual machines (VMs), such as on the order of thousands of VMs each. These data centers may be supported by their own servers and hypervisors.

Figure 3:
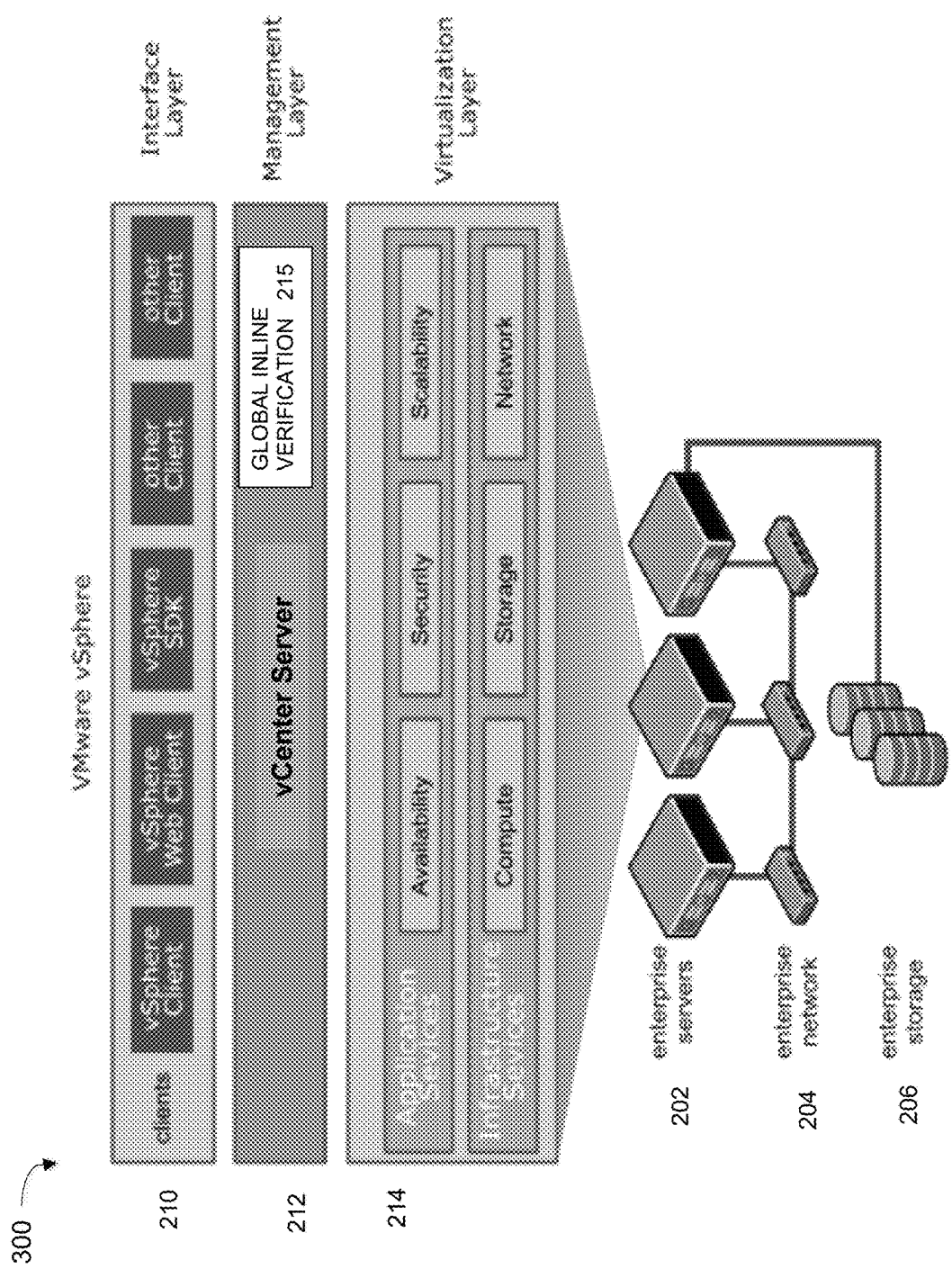
FIG. 3 illustrates a virtualization system that implements a global inline verification process for distributed file systems, under some embodiments.

FIG. 3 illustrates a virtualization system that implements a global inline name space verification process for distributed file systems, under some embodiments. System 300 of FIG. 2 represents components within data center 120 including enterprise servers 202, enterprise network 204 comprising routers, switches, interconnects, etc., and enterprise storage 206 comprising hard disk drives, tape drives, virtual storage devices, etc. These devices are managed by the vSphere system that comprises an interface layer 210, a management layer 212, and a virtualization layer 214. The interface layer comprises client processes such as network and web clients, software development kits (SDK), and other clients that allow users to remotely connect to the server. The virtualization layer 214 comprises application services and infrastructure services, and the management layer 212 includes a hypervisor (e.g., VMware ESXi) that abstracts processors, memory, storage and other resources into multiple virtual machines, and management software that provide the central control point for data center services across multiple hypervisor hosts.

Other components or processes provided by the vSphere system 200 include high availability processes, distributed resource schedulers or storage load balancers, fault tolerance, host profile managers, and so on. System 200 may also implement a virtual machine file system (VMFS) that provides a high-performance cluster file system for ESXi (or other hypervisor) VMs. It can also implement a distributed switching system that enables a single virtual switch to connect to multiple hosts in a cluster or multiple clusters for centralized management of network configurations. The system 200 of FIG. 2 illustrates one example of a virtualized environment that can be used to implement certain embodiments described herein, and embodiments are not so limited. For example, although example embodiments are described in relation to a virtualization infrastructure represented by the VMware vSphere™ system, any other virtualization infrastructure may be used.

The vCenter server 212 of system 200 generally provides a centralized platform for managing the vSphere environment and allows users to automate and deliver a virtual infrastructure across hybrid clouds and other similar networks. In an embodiment, the vCenter server implements a virtual protection storage appliance referred to as a "virtual scale-out" (VSO) system that grows or scales its protection storage until it exhausts one or more of its assigned vCenter resources, or it reaches a configured limit for attached storage.

Global Inline Verification Process

In an embodiment, the vCenter server includes, executes, or accesses a global inline verification process to perform regular online verification of the file system name space when it is spread across a number of computers. The scope of verification performed in process 215 involves verifying the integrity of the "name space" of a filesystem including the identity, size, and number of files and the data contents associated with them. In a distributed environment, this means that if one node thinks that another node has a file, it must be there and contain the correct contents.

Figure 4:
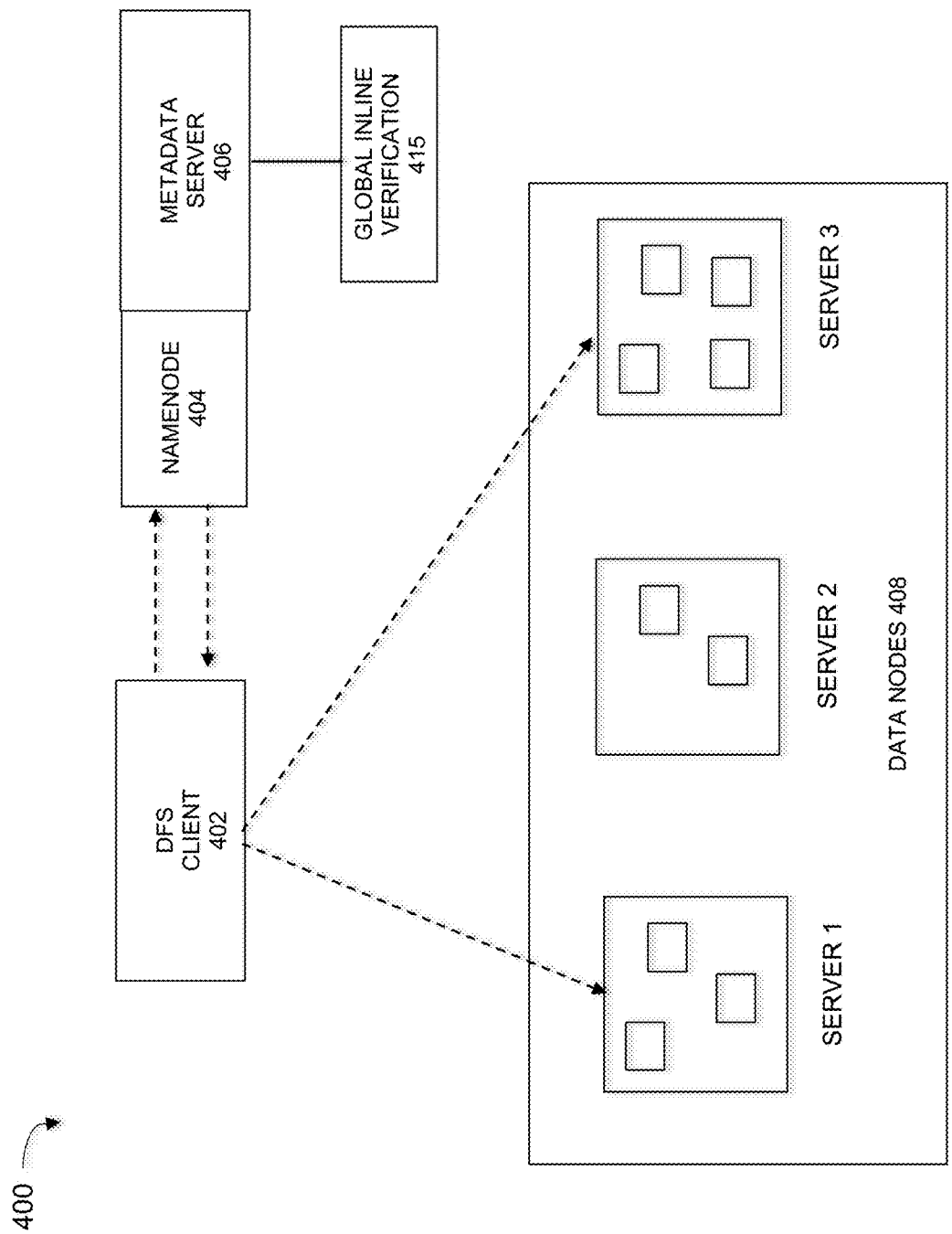
FIG. 4 illustrates a distributed file system that implements embodiments of a global inline verification process.

FIG. 4 illustrates a distributed file system that implements embodiments of a global inline verification process. As shown in FIG. 4, system 400 includes a DFS client 402 that accesses data nodes 408, where each node is supported by a corresponding server, denoted server 1, 2, 3, and so on up to N servers. A single metadata server 406 is maintained on a name node 404 to store the information on all the files in the filesystem. The data nodes 408 store just the data of a specified subset of these files. In an implementation, the DFS filesystem first creates the metadata server and then expands by spawning data servers across the available nodes in the network cluster. This metadata server and data server division of labor provides certain advantages that are leveraged by the global inline verification process 215.

To perform this procedure across a network of related servers (e.g., single metadata server 406 and one more or data servers 408) with minimal network impact, embodiments include a Global Dataless Snapshot (GDS). A standard snapshot captures the state of a filesystem at a given moment, but can result in a doubling of the space in use if the data of all the files must also be preserved. A dataless snapshot on the other hand saves just the meta-information on each file (e.g., its ID, length, and so on) thereby using only a fraction of the space of a data full snapshot. The "Global" part of this mechanism involves creating a snapshots for a given file system across all the nodes on the network where the metadata server and its data servers reside. After a small amount of synchronization, data is passed between the nodes. The snapshot creation itself proceeds in parallel and independently on each node thus speeding the process by maximizing the concurrent use of resources across the cluster.

Figure 5:
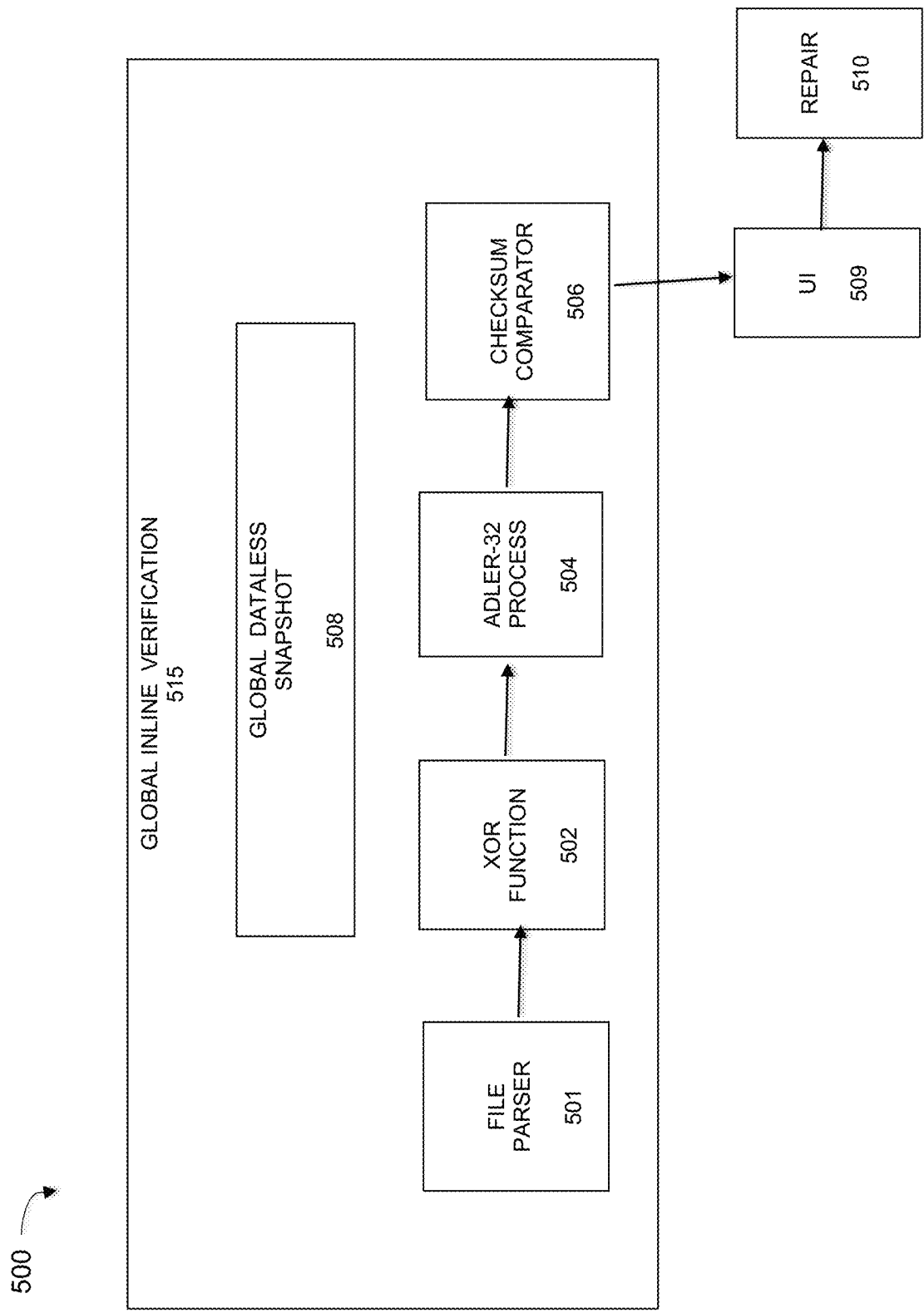
FIG. 5 is a block diagram illustrating certain functional components of a global inline verification process, under some embodiments.

In an embodiment, the metadata server 406 and each data server 408 maintains a checksum for all of its respective files. Any time a file is created, removed, or modified, the corresponding server's master checksum is updated. This master checksum is generated per Mtree. In this checksum process, each file's length, file-ID (or "inode number"), and disk location information is combined through an Exclusive-Or (XOR) operation with the all the information of the other files to form a data block. An Adler-32 algorithm is then applied to that data block. Such a method, though exceptionally fast, is rather weak as far as checksums go, but is sufficient since other processes in the file system are provided for data integrity. The global inline verification process 415 performs its own computation by walking all the files in the server name space and performing its own checksum calculation. On completion of the walk of the file system name space, the checksum computed by the inline process is compared with the server's master checksum. If a discrepancy in these values is detected, the ingest of new data is halted until repairs can be made. This method provides a way to quickly perform the verification of potentially hundreds of millions of files and represents a high-speed method for checksum verification FIG. 5 is a block diagram illustrating certain functional components of a global inline verification process 415, under some embodiments. In this case, process 415 may be implemented as a processing component, such as a processor executing program code, a hardware component comprising circuitry and components configured to perform certain operations, a firmware component comprising both hardware circuitry and processors, or any combination thereof. As shown in FIG. 5, the global inline verification component 515 includes a global dataless snapshot component 508 that takes a global dataless snapshot of the DFS namespace. A file parser or similar process walks all of the files in the namespace. The XOR function 502 combines the parsed information into data blocks, which are then processed by the Adler-32 process. In general, the Adler-32 process obtains a checksum by calculating two 16-bit checksums A and B and concatenating their bits into a 32-bit integer. In this process, A is the sum of all bytes in the stream plus one, and B is the sum of the individual values of A from each step. The checksums from the metadata server and all of the data servers are then compared in comparator 506. The results of the comparison performed in comparator 506 may then be provided to a user interface (UI) 509 for the transmission of an alert or notification in the event of a discrepancy, and or a command to repair the file system inconsistency by a separate repair module 510.

Figure 6:
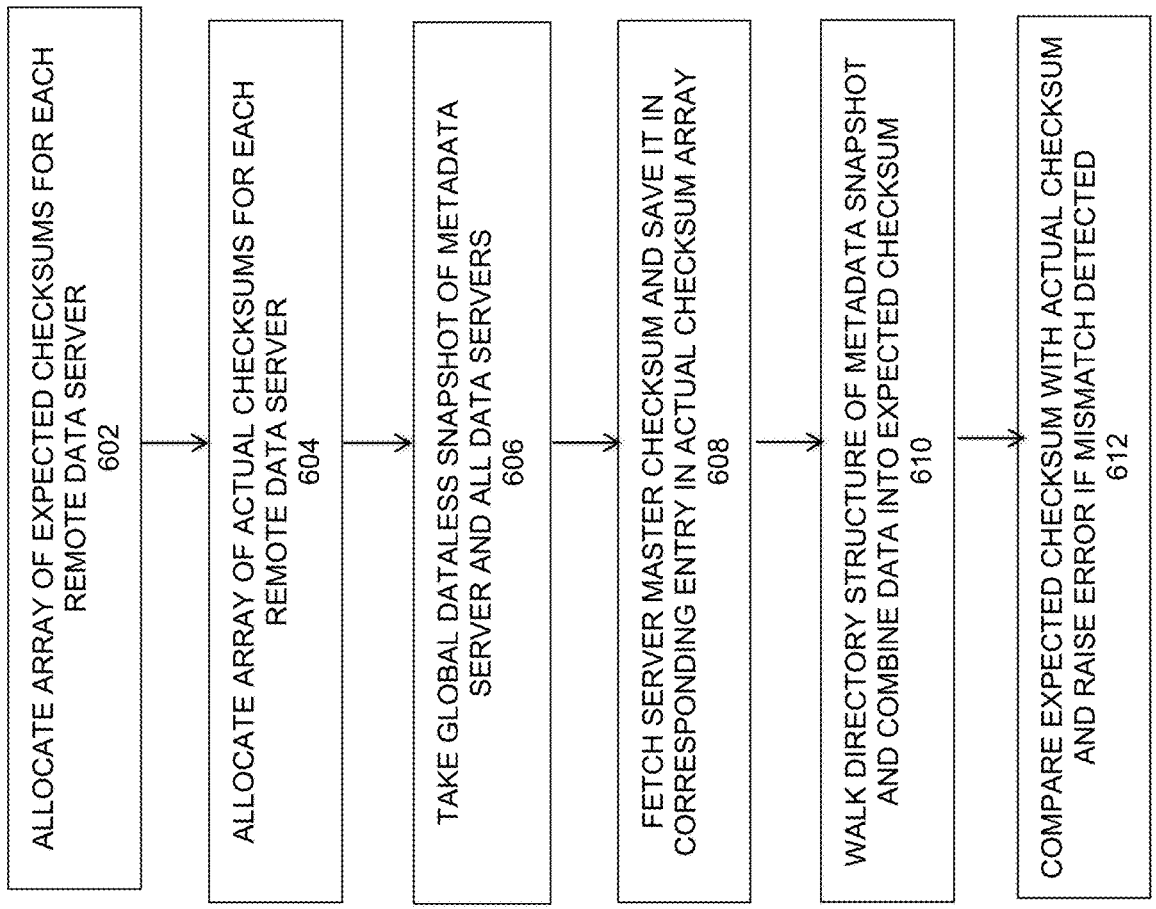
FIG. 6 is a flowchart illustrating certain method steps for the global inline verification process, under some embodiments.

In an embodiment, the global inline verification module 515 is resident in or controlled by the metadata server 406, which possesses information on the location of all the files on its own node and those of its data servers. FIG. 6 is a flowchart illustrating certain method steps for the global inline verification process and as executed by the metadata server, under some embodiments. The process 600 of FIG. 6 begins by allocating and initializing an array of expected-checksums, one for each remote data server associated with the metadata server, 602. The process then allocates an array of actual-checksums, one for each remote data server, 604. The snapshot component then takes a global dataless snapshot of the metadata server and all its data servers, 606. The process then fetches the server master checksum from the snapshot of each remote server and saves it in its corresponding entry in the actual-checksums array, 608. The file parser on the metadata server walks the directory structure of the metadata server's instance of the snapshot. For each file type that is a remote file (i.e., one that has its data residing on a data server) the process combines its data into the expect-checksum for that data server, 610. Upon completion of the tree walk, the comparator compares the expected-checksum for each data-server with the actual-checksum received from each data server, 612. An error message is generated and transmitted if a mismatch is detected. This message can also include specific information including the identity of which data-server node is out of compliance to aid in any remedial or repair operations.

To achieve the requisite data integrity, it is required that inline name-space verification continues to run on all nodes where data servers exist in their normal single-node manner. Generally, however, there is no need to coordinate this activity. In other words, all of the servers, both metadata and data-servers, run this inline process, with only the metadata server executing process 600. Running the inline process on the data servers is required because the checksums fetched after the global data snapshot may themselves be defective. Even though the inline name-space verification running on the remote data servers may not detect corruption until some later point in time, it will eventually be detected. Likewise an instance of data corruption could be detected on the data server node prior to the inline process 600 running on the metadata node. Either way this relaxed ordering, essentially a form of lazy evaluation, will do its job of assuring consistency across the cluster, while allowing the nodes to operate with substantial autonomy and a high degree of parallelism.

Below is provided example programming code of a checksum data structure used by the global inline verification process, under some embodiments.

```
/*
 * On-disk and in-memory DM checksum.
 */
typedef struct {
    checksum_flags_t flags;   /* Flags and version number of this struct */
    long int count;           /*
                               * exact number of user files, this has to
be signed
                               * integer - partial checksum could have
negative count
                               */
    fileid_t fid;             /* XOR of all FileIDs in the BTree */
    content_handle_t ch;      /* XOR of all ContentHandles in the BTree
                               */
    unsigned int adler;       /* Adler32 checksum of this structure (must
be last) */
} _attribute_ ((_packed_)) checksum_t;
```

The above code segment is provided for purposes of example only, and embodiments are not so limited. Any equivalent or similar program or program structure may be used to implement a global inline name space verification process for DFS depending on system configuration, constraints and requirements.

System Implementation

Figure 7:
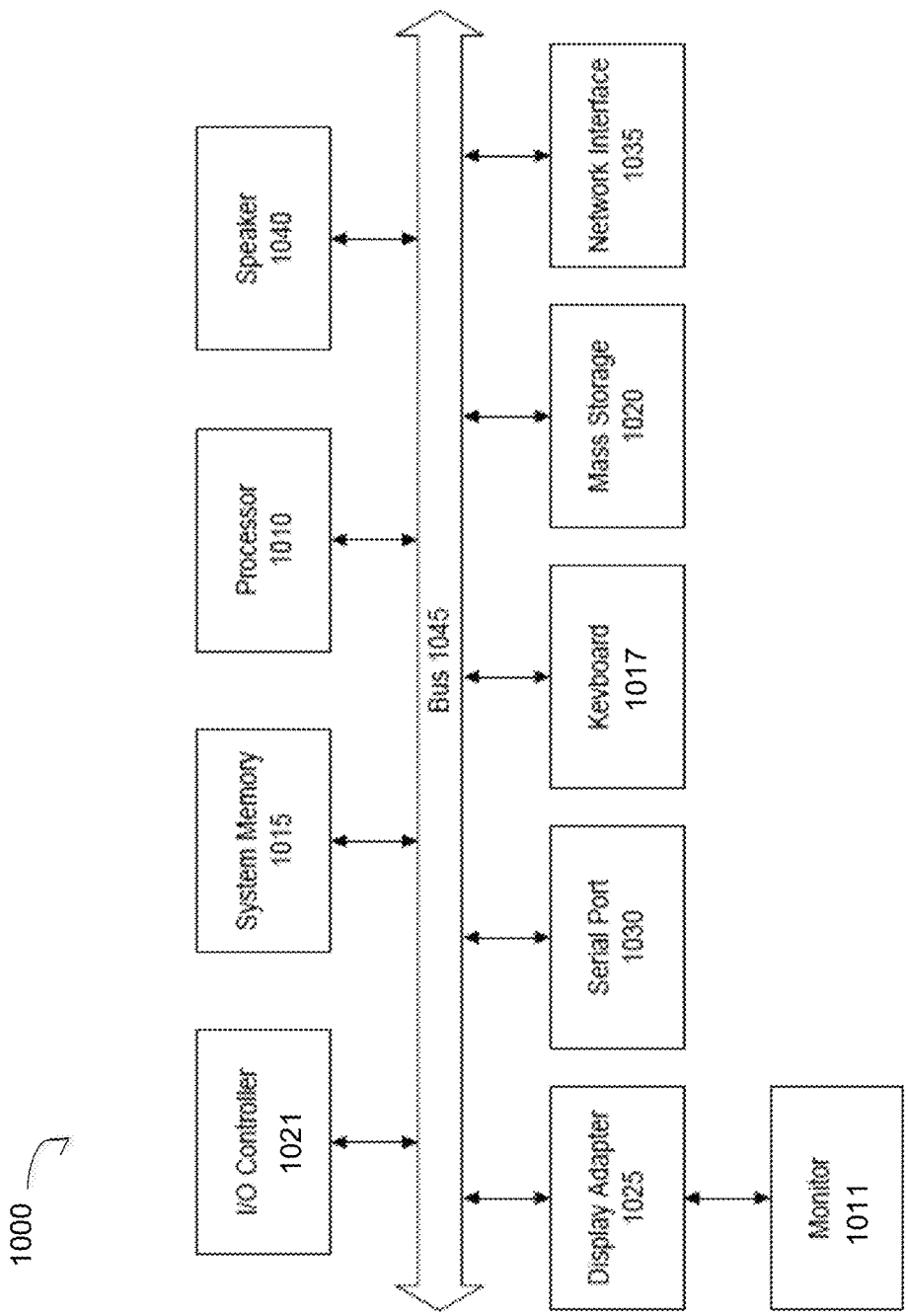
FIG. 7 is a block diagram of a computer system used to execute one or more software components of a global inline verification process for distributed file systems, under some embodiments.

FIG. 7 is a block diagram of a computer system used to execute one or more software components of an global inline verification process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing global inline name space verification for a distributed file system in a network of a metadata server coupled to a plurality of data servers, the method comprising:
   maintaining, on a name node of the network, the metadata server storing data of all files of the file system;
   spawning, across available nodes of the network, the plurality of data servers, each data server of the plurality of data servers storing only data of specified subsets of the files;
   allocating, by the metadata server only and for each data server, an array of expected-checksums and an array of actual checksums to provide a mechanism to detect instances of data corruption on a data server without needing coordination among the plurality data servers as separate machines;
   taking a global dataless snapshot of the metadata server and each of the plurality of data servers;
   fetching a server master checksum from the global data dataless snapshot of each data server;
   saving each fetched server master checksum in a corresponding entry in the actual-checksums array;
   walking a directory structure of the metadata server's global dataless snapshot;
   combining, for each file type of files stored on a respective data server of the plurality of data servers, file data into the expected-checksum for the respective data server; and comparing, on completion of the walking, the expected-checksum for each data server with the actual-checksum of each data server.

2. The method of claim 1 further comprising generating an error if a mismatch is detected in the comparing.

3. The method of claim 2 further comprising generating an error message noting which data server of the plurality of data servers caused the error.

4. The method of claim 1 wherein the server master checksum is generated for each data server by combining in an Exclusive-OR operation: file length, file identifier, and a disk location of each file with corresponding information for all other files of the respective specific subset of files to create a data block.

5. The method of claim 4 further comprising performing an Adler-32 checksum process to the data block to create a checksum for a respective data server.

6. The method of claim 5 further comprising, for each data server and the metadata server, updating its respective checksum upon creation, removal, or modification of any a file maintained by a respective server.

7. The method of claim 1 wherein the global dataless snapshot comprises a data element storing only metadata of the distributed file system at a specific point in time.

8. The method of claim 1 wherein the network comprises a cluster network including clustered backup appliances as part of a deduplication backup system operated by a backup server.

9. The method of claim 8 wherein the distributed file system utilizes Mtrees storing files and directories in respective nodes in the deduplication backup system, and wherein the Mtree comprises user-defined logical partitions of a file system of the deduplication backup system.

10. A method of providing global inline name space verification for a distributed file system in a network of a metadata server coupled to a plurality of data servers, the method comprising:
maintaining, on a name node of the network, the metadata server storing data of all files of the file system;
spawning, across available nodes of the network, the plurality of data servers, each data server of the plurality of data servers storing only data of specified subsets of the files;
allocating, by the metadata server only and for each data server, a first array of expected-checksums and a second array of actual checksums to provide a mechanism to detect instances of data corruption on a data server without needing coordination among the plurality data servers as separate machines;
taking a global dataless snapshot of a namespace of the distributed file system;
walking all files in the namespace for each data server and the metadata server to generate parsed information;
combining, in an Exclusive-OR operation, the parsed information into data blocks for each server;
obtaining a checksum of each data block of the data blocks;
comparing actual and expected checksums of the first and second arrays from the metadata server and all of the data servers; and
generating an alert if a comparison of any actual and expected checksums do not match.

11. The method of claim 10 wherein the checksums are obtained by an Adler-32 process that obtains a checksum by calculating two 1b-bit checksums A and B and concatenating their bits into a 32-bit integer.

12. The method of claim 10 wherein the parsed information comprises file length, file identifier, and disk location for each file with corresponding information for all of the other files of the respective specific subset of files to create a corresponding data block.

13. The method of claim 12 further comprising, for each data server and the metadata server, updating its respective checksum upon creation, removal, or modification of any a file maintained by a respective server.

14. The method of claim 10 wherein the global dataless snapshot comprises a data element storing only metadata of the distributed file system at a specific point in time.

15. A system for providing global inline name space verification for a distributed file system in a network of a metadata server coupled to a plurality of data servers, comprising:
the metadata server maintained on a name node of the network and storing data of all files of the file system;
the plurality of data servers spawned across available nodes of the network, wherein each data server of the plurality of data servers stores only data of specified subsets of the files;
a first array of expected-checksums allocated by the metadata server only, and a second array of actual checksums for each data server to provide a mechanism to detect instances of data corruption on a data server without needing coordination among the plurality data servers as separate machines;
a processor-based global snapshot component executing program code taking a global dataless snapshot of a namespace of the distributed file system;
a processor-based file parser executing program code walking all files in the namespace for each data server and the metadata server to generate parsed information;
an Exclusive-OR circuit combining the parsed information into data blocks for each server;
a processor-based checksum generator executing program code obtaining a checksum of each data block of the data blocks;
a processor-based comparator executing program code comparing actual and expected checksums using the first and second arrays from the metadata server and all of the data servers; and
a user interface generating an alert a comparisonof any actual and expected checksums do not match.

16. The system of claim 15 wherein the global dataless snapshot comprises a data element storing only metadata of the distributed file system at a specific point in time.

17. The system of claim 15 wherein the parsed information comprises file length, file identifier, and disk location for each file of the walked files with corresponding information for all of the other files of the respective specific subset of files to create a corresponding data block, and wherein each data server and the metadata server updates its respective checksum upon creation, removal, or modification of a file maintained by a respective server.

18. The system of claim 15 wherein the network comprises a cluster network including clustered backup appliances as part of a deduplication backup system operated by a backup server, and wherein the distributed file system utilizes Mtrees storing files and directories in respective nodes in the deduplication backup system, and wherein the Mtree comprises user-defined logical partitions of a file system of the deduplication backup system.

* * * * *